US011758187B2

(12) United States Patent
Fleureau et al.

(10) Patent No.: US 11,758,187 B2
(45) Date of Patent: Sep. 12, 2023

(54) METHODS, DEVICES AND STREAM FOR ENCODING AND DECODING VOLUMETRIC VIDEO

(71) Applicant: InterDigital CE Patent Holdings, SAS, Paris (FR)

(72) Inventors: Julien Fleureau, Cesson-Sevigne (FR); Thierry Tapie, Cesson-Sevigne (FR); Franck Thudor, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 44 days.

(21) Appl. No.: 17/464,621

(22) Filed: Sep. 1, 2021

(65) Prior Publication Data
US 2021/0400305 A1  Dec. 23, 2021

Related U.S. Application Data

(63) Continuation of application No. 16/632,480, filed as application No. PCT/EP2018/069309 on Jul. 16, 2018, now Pat. No. 11,122,294.

(30) Foreign Application Priority Data

Jul. 21, 2017 (EP) .................................... 17305975

(51) Int. Cl.
*H04N 19/85* (2014.01)
*H04N 19/136* (2014.01)
(Continued)

(52) U.S. Cl.
CPC ......... *H04N 19/597* (2014.11); *H04N 19/136* (2014.11); *H04N 19/172* (2014.11);
(Continued)

(58) Field of Classification Search
CPC ....... G06T 15/20; G06T 2210/56; G06T 9/00; H04N 19/136; H04N 19/172;
(Continued)

(56) References Cited

U.S. PATENT DOCUMENTS 9,633,483 B1 * 4/2017 Xu ....................... G06V 20/653
2003/0067461 A1 4/2003 Fletcher et al.
(Continued)

OTHER PUBLICATIONS

Ochotta et al. "Compression of Point-Based 3D Models by Shape-Adaptive Wavelet Coding of Multi-Height Fields", Proceedings of the First Eurographics Conference on Point-Based Graphics, Zurich, Switzerland, Jun. 2, 2004.), pp. 104-442 (Year: 2004).*
(Continued)

*Primary Examiner* — Anner N Holder
(74) *Attorney, Agent, or Firm* — CONDO ROCCIA KOPTIW LLP

(57) ABSTRACT

A sequence of point clouds is encoded as a video by an encoder and transmitted to a decoder which retrieves the sequence of point clouds. Visible points of a point cloud are iteratively projected on projection maps according to at least two centers of projection, to determine a patch data item lists. One of the centers of projection is selected and corresponding image patches are generated and packed into a picture. Pictures and associated patch data item list are encoded in a stream. The decoding method decodes pictures and associated patch data item lists. Pixels of image patches comprised in pictures are un-projected according to data stored in associated patches. The methods have the advantage of encoding every point of point clouds in a manner avoiding artifacts and allowing decoding at video frame rate.

18 Claims, 9 Drawing Sheets

(51) Int. Cl.
*H04N 19/172* (2014.01)
*H04N 19/177* (2014.01)
*H04N 19/182* (2014.01)
*H04N 19/186* (2014.01)
*H04N 19/597* (2014.01)

(52) U.S. Cl.
CPC ......... *H04N 19/177* (2014.11); *H04N 19/182* (2014.11); *H04N 19/186* (2014.11); *H04N 19/85* (2014.11)

(58) Field of Classification Search
CPC .. H04N 19/177; H04N 19/182; H04N 19/186; H04N 19/20; H04N 19/597; H04N 19/85
See application file for complete search history.

(56) References Cited

U.S. PATENT DOCUMENTS

| | | | |
|---|---|---|---|
| 2004/0222987 A1* | 11/2004 | Chang | G06T 7/593 345/419 |
| 2014/0092439 A1 | 4/2014 | Krig | |
| 2016/0047903 A1 | 2/2016 | Dussan | |
| 2016/0086353 A1 | 3/2016 | Lukac et al. | |
| 2017/0078570 A1 | 3/2017 | Ito et al. | |
| 2017/0094262 A1 | 3/2017 | Peterson et al. | |
| 2017/0347100 A1 | 11/2017 | Chou et al. | |
| 2019/0087979 A1 | 3/2019 | Mammou et al. | |
| 2019/0318488 A1 | 10/2019 | Lim et al. | |

OTHER PUBLICATIONS

Choi et al., "OMAF PACK-VE: Multi-Patch Based Packing for Omnidirectional Video", Samsung Electronics, ISO/IEC JTC1/SC29NVG11 MPEG2017/M39841, Geneva, Switzerland, Jan. 2017, 6 pages.
Jylanki, Jukka, "A Thousand Ways to Pack the Bin—A Practical Approach to Two-Dimensional Rectangle Bin Packing", Available at <https://core.ac.uk/display/103387426>, Feb. 27, 2010, pp. 1-50.
Kang et al., "VR Signaling for MMT", KyungHee Univ., ISO/IEC JTC1/SC29/WG11 MPEG2017/M40465, Hobart, Australia, Apr. 2017, 4 pages.
Ochotta et al., "Compression of Point-Based 3D Models by Shape-Adaptive Wavelet Coding of Multi-Height Fields", Symposium on Point-Based Graphics, Zurich, Switzerland, Jun. 2-4, 2004, 10 pages.
Ochotta et al., "Image-Based Surface Compression", Computer Graphics Forum, vol. 27, No. 6, Sep. 20, 2008, 15 pages.
Oh et al., "SEI Message for Signaling of 360-Degree Video Information", JCTVC-Z0026, LG Electronics, Joint Collaborative Team on Video Coding (JCT-VC) of ITU-T SG WP 3 and ISO/IEC JTC 1/SC 29/WG 11, 26th Meeting: Geneva, CH, Jan. 12-20, 2017, pp. 1-6.

* cited by examiner

METHODS, DEVICES AND STREAM FOR ENCODING AND DECODING VOLUMETRIC VIDEO

CROSS-REFERENCE TO RELATED APPLICATIONS

This application is a continuation of U.S. patent application Ser. No. 16/632,480, filed Jan. 20, 2020, which is the National Stage Entry under 35 U.S.C. § 371 of Patent Cooperation Treaty Application No. PCT/EP2018/069309, filed Jul. 16, 2018, which claims priority from European Patent Application No. 17305975.9, filed Jul. 21, 2017, the entire contents of each of which are hereby incorporated by reference herein.

1. TECHNICAL FIELD

The present disclosure relates to the domain of volumetric video content. The present disclosure is also understood in the context of the formatting of the data representative of the volumetric video content, for example for an immersive rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Immersive video, also called 360° flat video, allows the user to look all around himself through rotations of his head around a still point of view. Rotations only allow a 3 Degrees of Freedom (3 DoF) experience. Even if 3 DoF video is sufficient for a first omnidirectional video experience, for example using a Head-Mounted Display device (HMD), 3 DoF video may quickly become frustrating for the viewer who would expect more freedom, for example by experiencing parallax. In addition, 3 DoF may also induce dizziness because of a user never only rotates his head but also translates his head in three directions, translations which are not reproduced in 3 DoF video experiences.

Volumetric video (also known as 6 Degrees of Freedom (6 DoF) video) is an alternative to 3 DoF video. When watching a 6 DoF video, in addition to rotations, the user can also translate his head inside the watched content and experience parallax. Such videos considerably increase the feeling of immersion and the perception of the scene depth but also prevent from dizziness by providing consistent visual feedback during head translations. The associated content is basically created by the means of dedicated sensors allowing the simultaneous recording of color and depth of the scene of interest. The use of rig of color cameras combined with photogrammetry techniques is a common way to do this recording.

While 3 DoF videos comprise a sequence of images resulting from the un-mapping of texture images (e.g. spherical images encoded according to latitude/longitude projection or equirectangular projection), 6 DoF video frames embed information from several points of views. They can be viewed as a temporal series of point clouds resulting from a three-dimension capture. Two kinds of volumetric videos may be considered depending on the viewing conditions. A first one (i.e. complete 6 DoF) allows a complete free navigation inside the video content whereas a second one (aka. 3 DoF+) restricts the user viewing space to a limited volume, allowing limited translation of the head and parallax experience. This second context is a natural compromise between free navigation and passive viewing conditions of a seated audience member.

Encoding point clouds in a sequence of frames (i.e. a video content) in a manner that is in line with standard video pipeline (e.g. MPEG), taking advantage of compression and transport standards, and that allows a decoding at a video frame rate (i.e. at least 24 images/point clouds per second) is a challenge. The present principles present methods, devices and stream to address these coding and decoding technical problems.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding a point cloud into a stream. The method comprises:
  determining, for the point cloud, a first list of patch data items, a patch data item comprising:
    information identifying a center of projection;
    a description of a region of the space, the region being defined according to the center of projection, an angular range and a depth range; and,
    information identifying an area within a picture;
  generating the picture comprising a set of image patches, each image patch being obtained by projecting points of the point cloud comprised in the region of the space of a patch data item of the first list on the picture according to the center of projection; and
  encoding, in the stream, the picture and the first list of patch data items.
  The operation of determining, for the point cloud, a list of data items comprises:
    a. for at least two different centers of projection among a group of centers of projection:
      projecting a part of the point cloud on a projection map according to the center of projection, the part comprising points of the point cloud visible from the center of projection;
      determining a second list patch data items by clustering adjacent pixels of the projection map according to depth information and determining the region of the space for each patch data item according to a corresponding cluster;
    b. selecting one center of projection according to the corresponding second list of patch data items and adding the corresponding second list of patch data items to the first list of patch data items; and c. removing the part of the point cloud visible from the selected center of projection;

d. reiterating a, b and c until the point cloud is empty or the patch data item list is full.

According to a particular characteristic, the point cloud comprises points of a group of point clouds of a sequence of point clouds. A unique patch data item list is determined for the group of pictures, each picture of the group being generated for a point cloud of the group of point clouds. The group of pictures is encoded in the stream in association with the unique patch data item list.

According to a particular characteristic, pixels of an image patch store a depth value. The depth value is determined according to depth range of the patch data item associated with the image patch.

The present disclosure also relates to a device for encoding a point cloud into a stream. The device comprises a memory associated with at least one processor configured to:
  determine, for the point cloud, a first list of patch data items, a patch data item comprising:
    information identifying a center of projection;
    a description of a region of the space, the region being defined according to the center of projection, an angular range and a depth range; and,
    information identifying an area within a picture;
  generate the picture comprising a set of image patches, each image patch being obtained by projecting points of the point cloud comprised in the region of the space of a patch data item of the first list on the picture according to the center of projection; and
  encode, in the stream, the picture and the first list of patch data items.

The present disclosure also relates to a method of decoding a point cloud from a stream. The method comprises:
  decoding a picture and a list of patch data items from the stream, a patch data item comprising:
    information identifying a center of projection;
    a description of a region of the space, the region being defined according to the center of projection, an angular range and a depth range; and,
    information identifying an area within the picture;
  unpacking image patches from the picture according to the information identifying an area within the picture of a patch data item of the list; and
  decoding points of the point cloud by un-projecting pixels of each unpacked image patch according to the associated patch data item.

The present disclosure also relates to device for decoding a point cloud from a stream. The device comprises a memory associated with at least a processor configured to:
  decode a picture and a patch data item from the stream, a patch data item comprising:
    information identifying a center of projection;
    a description of a region of the space, the region being defined according to the center of projection, an angular range and a depth range; and,
    information identifying an area within the picture;
  unpack image patches from the picture according to the information identifying an area within the picture of a patch data item of the list; and
  decode points of the point cloud by un-projecting pixels of each unpacked image patch according to the associated patch data item.

4. LIST OF FIGURES

The present disclosure will be better understood, and other specific features and advantages will emerge upon reading the following description, the description making reference to the annexed drawings wherein.

Figure 2:
FIG. 2 shows an image 20 representing a three-dimension scene comprising a surface representation of several objects captured as a point cloud as illustrated in FIG. 1, according to a non-restrictive embodiment of the present principles.
Figure 3:
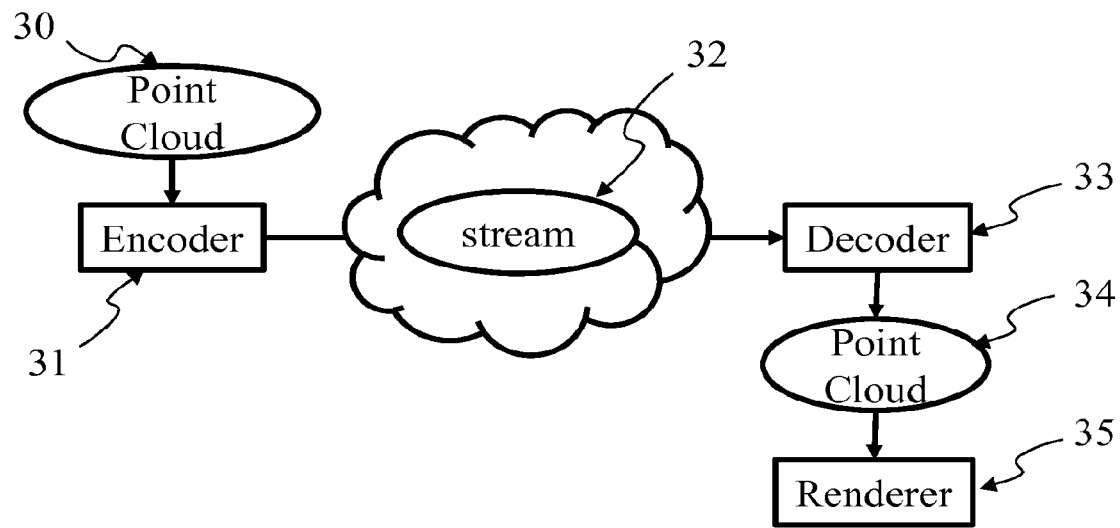
FIG. 3 illustrates an example of the encoding, transmission and decoding of a sequence of point clouds, for example the point clouds of FIG. 2, according to a non-restrictive embodiment of the present principles.
Figure 5:
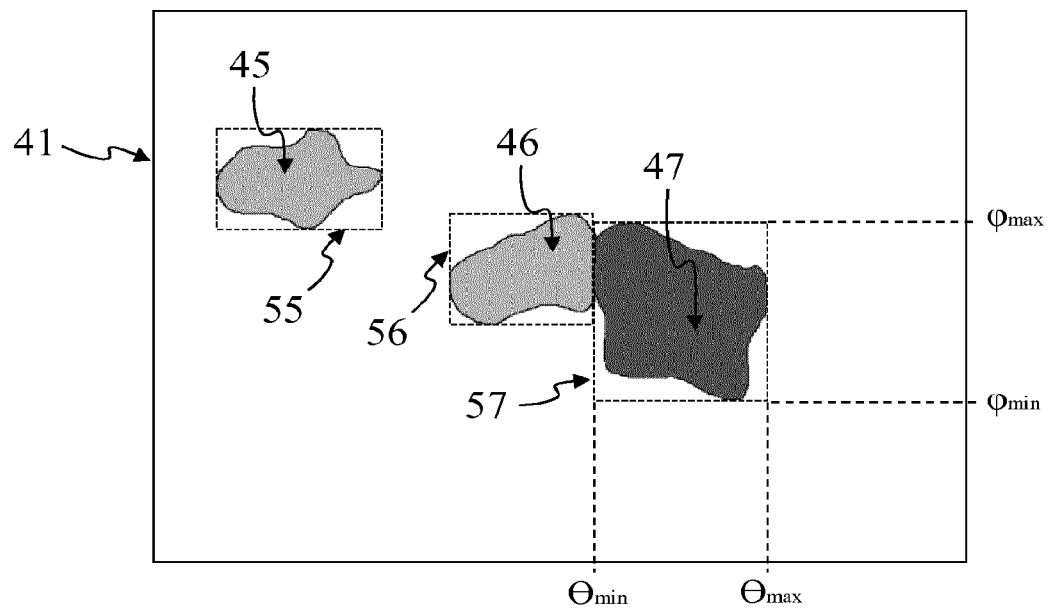
FIG. 5 shows a diagrammatical example of projection map 41 of FIG. 4, according to a non-restrictive embodiment of the present principles.
Figure 6:
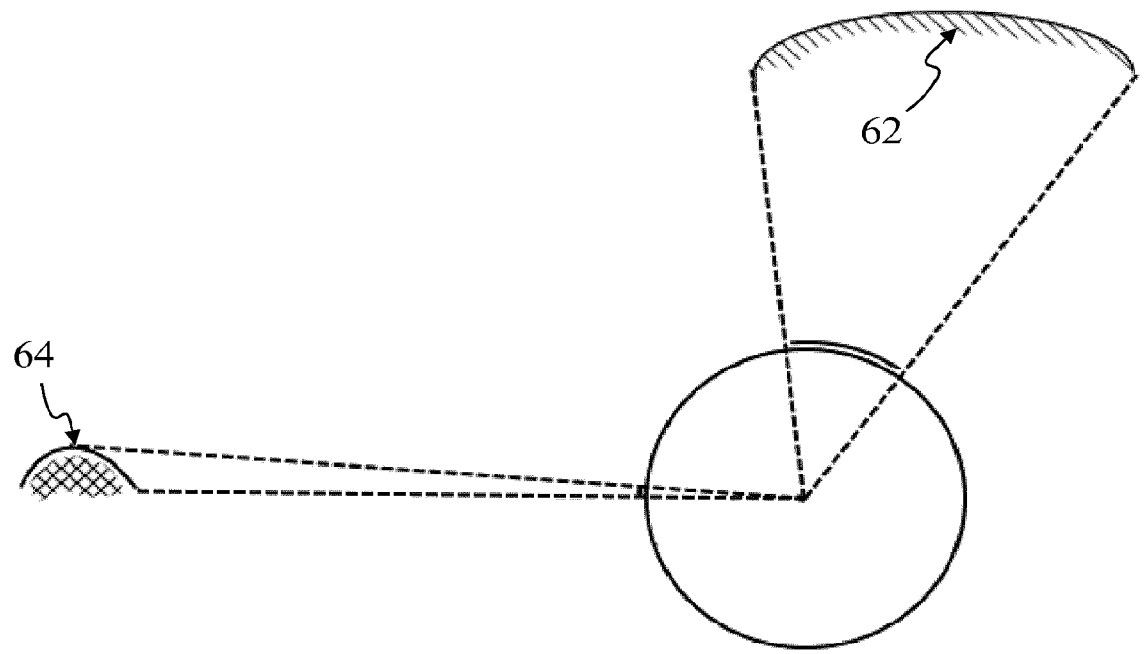
FIG. 6 illustrates a second iteration of the encoding method according to the center of projection of FIG. 5, according to a non-restrictive embodiment of the present principles.
Figure 7:
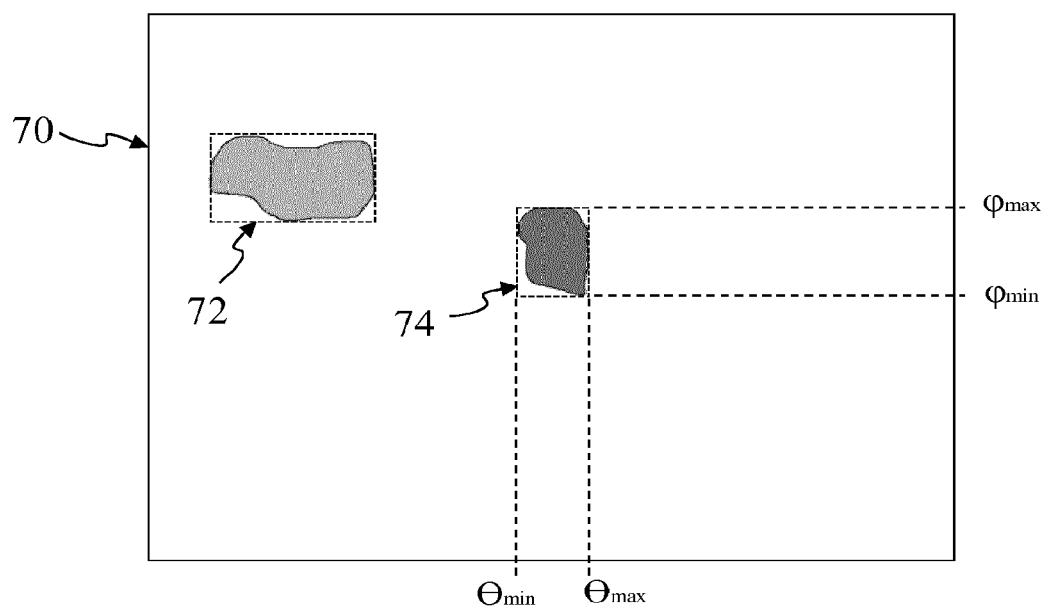
Figure 8:
Figure 9:
Figure 10:
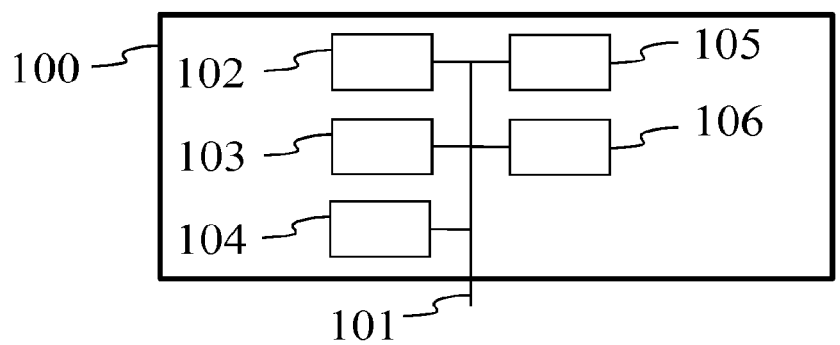
Figure 11:
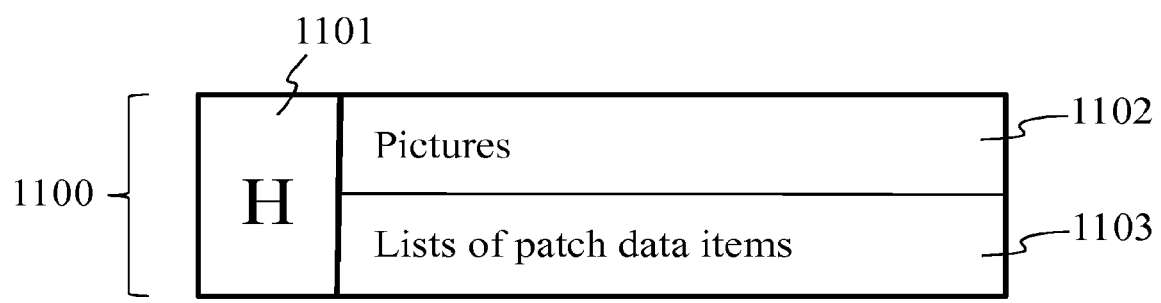
Figure 12:
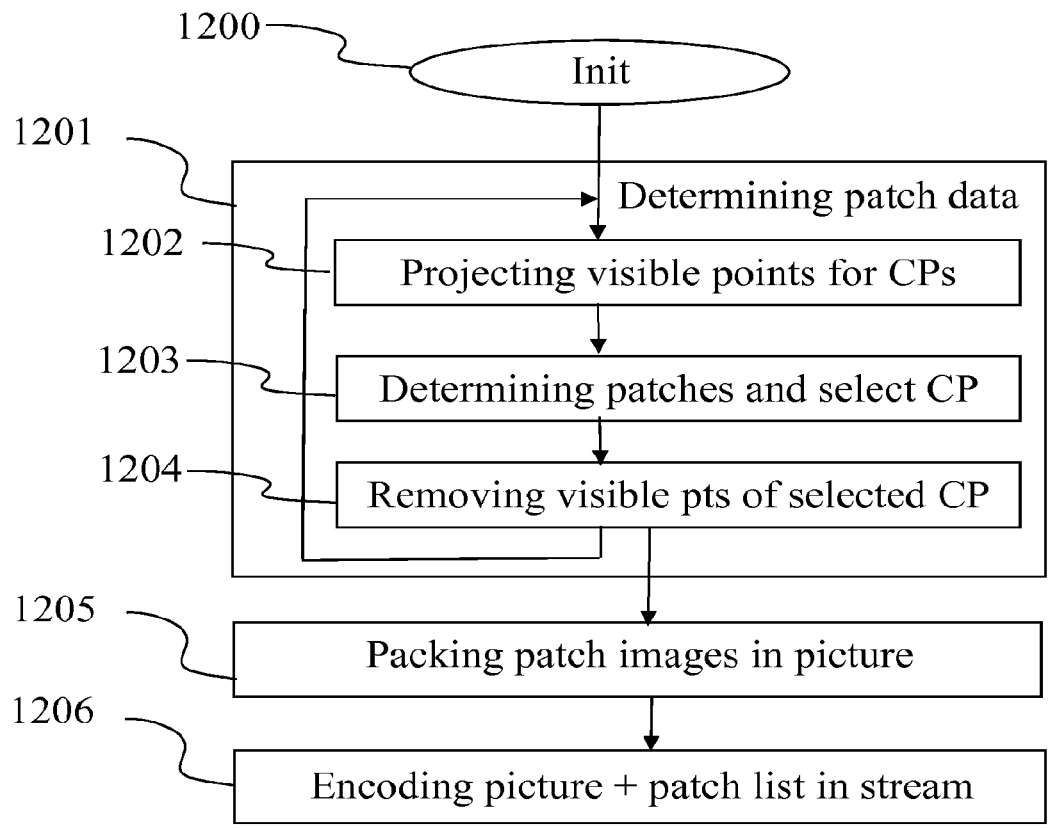
Figure 13:
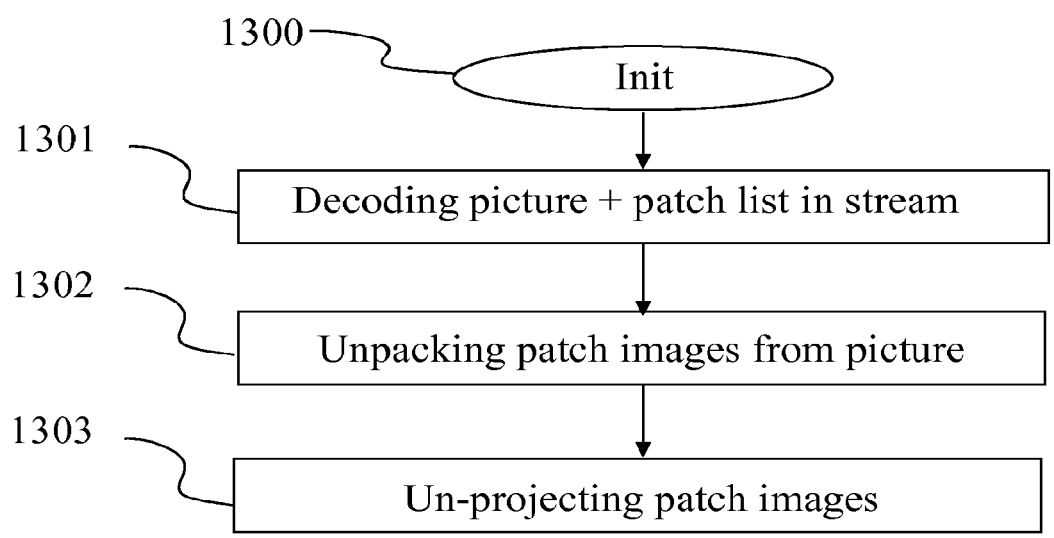
Figure 14:
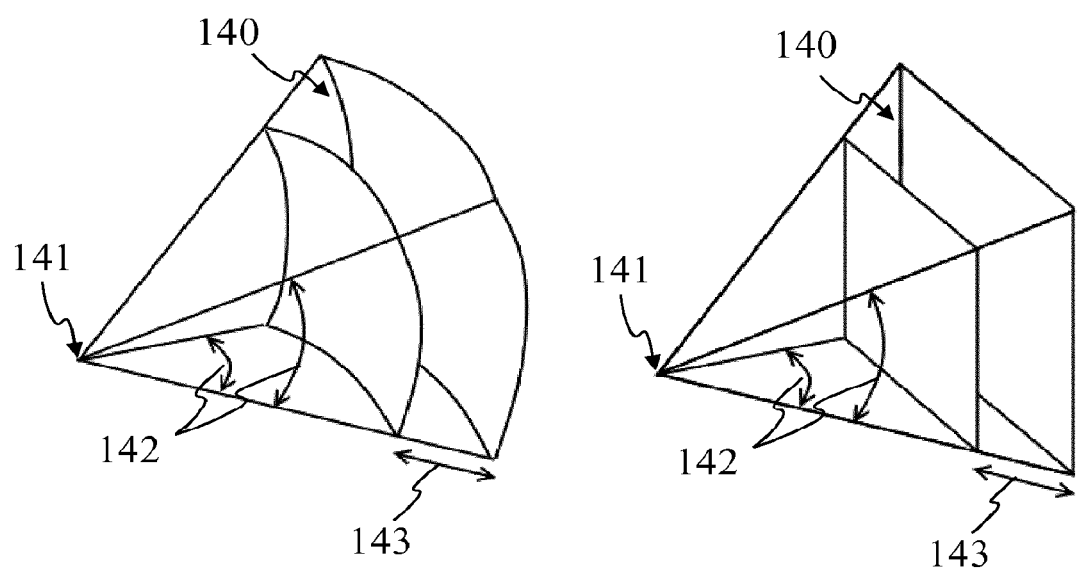
Figure 15:
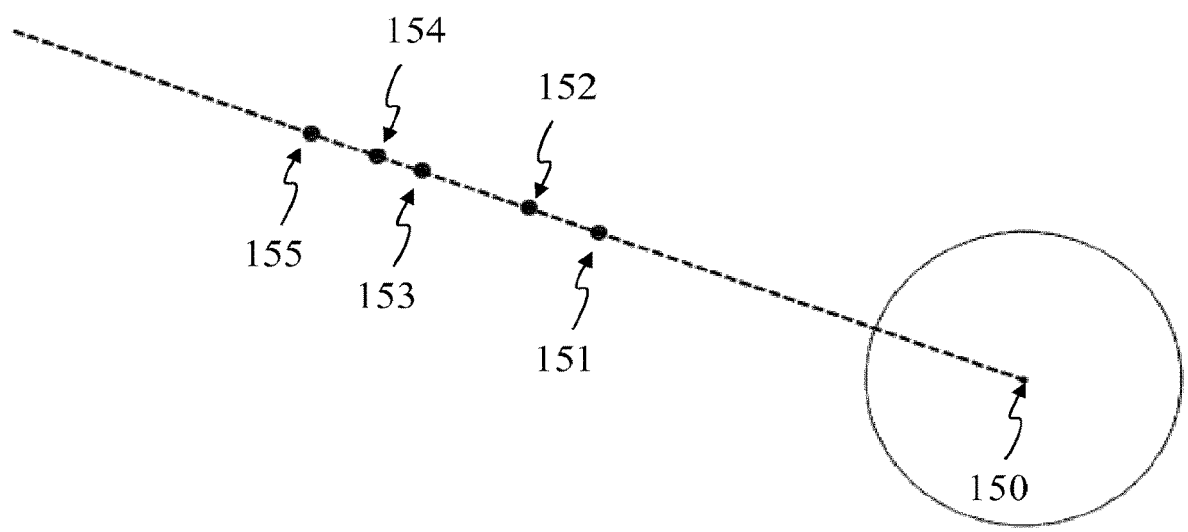
Figure 16:
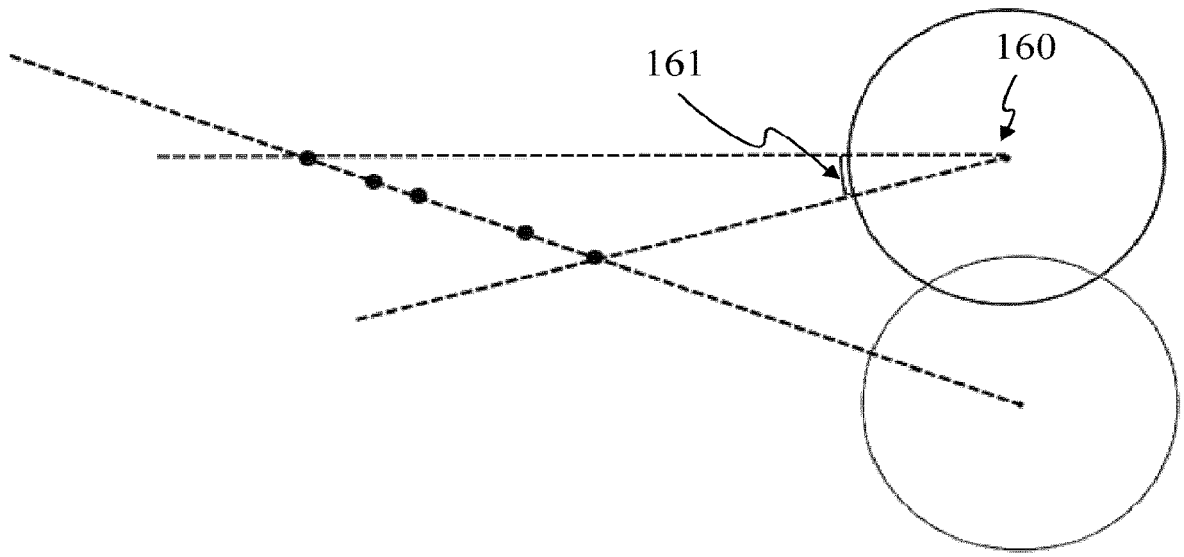

FIG. 7 diagrammatical shows the projection map resulting of the projection of the visible points of the remaining point cloud of FIG. 6, according to a non-restrictive embodiment of the present principles;

FIG. 14 shows a region of the space as described in a patch data item of FIGS. 5 and 7, according to a spherical projection on the left and according to a cubical projection on the right, according to a non-restrictive embodiment of the present principles;

FIG. 15 illustrates a point cloud to encode located on a line (or a plane) passing through the center of projection, according to a non-restrictive embodiment of the present principles;

FIG. 16 illustrates the point cloud of FIG. 15 processed according to another center of projection, according to a non-restrictive embodiment of the present principles;

FIG. 8 shows a picture comprising image patches encoding depth information of the point cloud of the scene of FIG. 2, according to a non-restrictive embodiment of the present principles;

FIG. 9 shows a picture comprising color image patches of the patch data item list determined for the point cloud of the scene illustrated on FIG. 2, according to a non-restrictive embodiment of the present principles;

FIG. 10 shows an example architecture of a device which may be configured to implement a method described in relation with FIGS. 12 and/or 13, according to a non-restrictive embodiment of the present principles;

FIG. 11 shows an example of an embodiment of the syntax of a stream when the data are transmitted over a packet-based transmission protocol, according to a non-restrictive embodiment of the present principles;

FIG. 12 illustrates a method for encoding a point cloud in a stream, in a device 10 of FIG. 10 configured to be a device 31 of FIG. 3, according to a non-restrictive embodiment of the present principles;

FIG. 13 illustrates a method for decoding a point cloud from a stream, in a device of FIG. 10 configured to be a device 33 of FIG. 3, according to a non-restrictive embodiment of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

The present principles will be described in reference to a particular embodiment of a method of encoding a sequence of point clouds in a stream and a method of decoding the sequence of point clouds from the stream.

The encoding method obtains a sequence of point clouds as entry. In a first operation, points of a point cloud of the sequence are iteratively projected on at least two projection maps to determine patches. Depth (i.e. the distance between a point and the center of projection used for the projection map) is stored in the projection map pixels. A patch corresponds to a part of the projected points which define an area of adjacent pixels in the projection map and which are depth consistent. Points projected in a cluster are comprised in a region of the space defined by an angular range and a depth range as described in relation to FIG. 14. For an iteration, only points visible from a center of projection are projected on a projection map. According to the coordinates of centers of projections, the part of the point cloud projected is different for two projection maps. Patches are clustered in the projection maps according to their connectivity and depth and added to a list of patch data item associated with the corresponding center of projection. One of the centers of projection is selected according to the associated list of patch data items. For example, the center of projection for which the average size of clusters is the higher is selected, the size of a cluster being, for instance, determined according to the volume occupied by the part of the point cloud used to determine this cluster. In a variant, the center of projection associated with the smallest number of clusters is selected. The part of the point cloud visible from the selected center of projection is removed from the point cloud and a new iteration is performed with the modified point cloud until the point cloud is empty or until the patch data item list is full.

In a second operation, when the selected list of patch data items is completed, image patches are arranged in a picture with a given angular resolution (e.g. 3 seconds per pixel or 5 seconds per pixel) according to the size that the projection of points of the patch data item forming the image patch will occupy in the picture. The arrangement consists in reserving an area in the picture for projecting (depth and color) the points associated with the patch data item. The size of the reserved area depends on the picture angular resolution and on the angular range of the patch data item. The location of the areas in the frame is optimized to cover the picture's frame without overlapping. The obtained picture is encoded in the stream in association with data representative of the selected list of patch data items. A patch data item comprises an identification of the selected center of projection, the description of the region of the space defined by the associated angular range and the depth range (i.e. the minimal and maximal depth of points of the patch) and the location of the associated image patch within the picture. So, the picture comprises image patches encoding points depth information. In a variant, the picture or a second picture also encodes points color information. In another embodiment, a group of point clouds of the sequence, gathered as a unique point cloud, is used as the entry point cloud of the encoding method. The patch data item list obtained by the iterative operation has the advantage of being temporally consistent. A unique set of data representative of the list of patch data items for this gathered point cloud is encoded in the stream and associated with the group of pictures (GoP), a picture being generated for each point cloud of the group. The generated stream has the advantage to be in line with standard video compression and transport pipelines.

The decoding method obtains the stream as entry. Pictures and associated data representative of a list of patch data items are decoded from the stream. A picture is associated with a list patch data items. A list of patch data items may be associated with a group of pictures (GoP). The sequence of point clouds is retrieved from the sequence of pictures, a point cloud of the sequence being obtained by un-projecting pixels of image patches comprised in a picture according to the associated patch data item. The location of a point is determined according to the depth information stored in the pixel, the coordinates of the pixel in the image patch and the patch data item. Coordinates of the projection point is obtained from the patch data item according to an identification information of the used center of projection among a group of centers of projection stored in a memory. In a variant, coordinates of the center of projection are obtained from the stream. The angle relatively to the center of projection and the distance between the point and the center of projection are determined and the point is placed in the point cloud. In a variant, the picture or a second picture comprises color information which is attributed to the un-projected point. The decoding method has the advantage to be straightforward and can be performed at least at a video frame rate by a processor.

Figure 1:
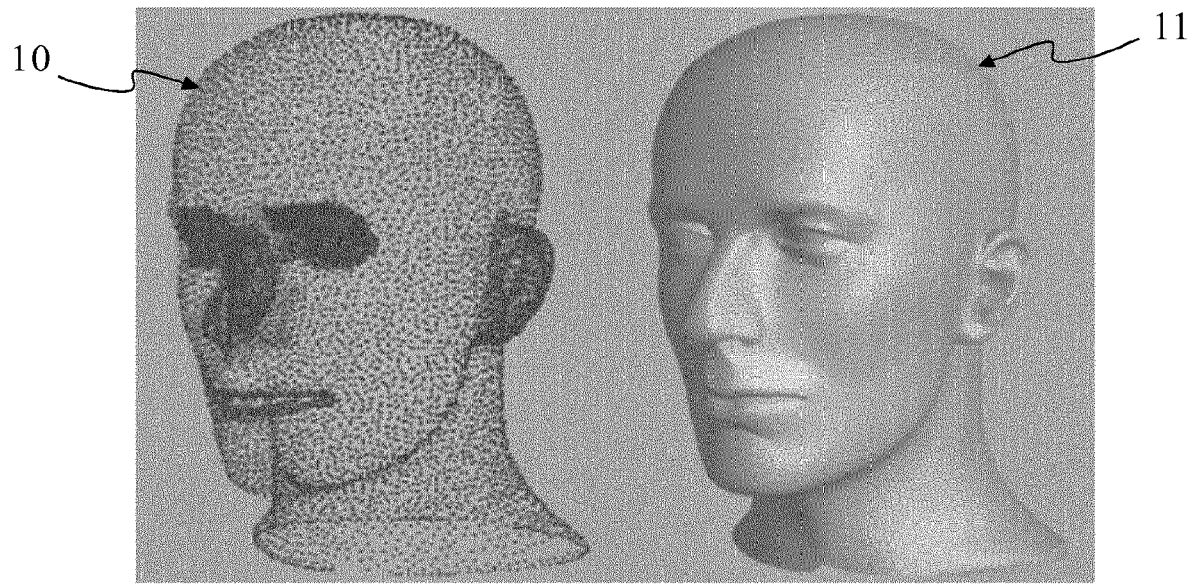
FIG. 1 shows a point cloud 10 and a surface 11 built over the point cloud, according to a non-restrictive embodiment of the present principles.

FIG. 1 shows a point cloud 10 and a surface 11 built over the point cloud. The point cloud 10 corresponds to a large collection of points representing the external surface or the external shape of an object or a group of objects. A point cloud may be seen as a vector based structure, wherein each point has its coordinates. For instance, a vector may be defined by three-dimensional coordinates XYZ in a frame of reference centered on an origin point. In another example, vectors are defined by radial coordinates (θ,φ,d) where (θ,φ) represents a three-dimension direction relative to a point of view and d the distance (also called 'depth') between the point of view and the point. A point may also have a color component that may be expressed in any color space, for example RGB (Red, Green and Blue) or YUV (Y being the luma component and UV two chrominance components). A surface 11 may be defined from the point cloud. The surface may be obtained according to several methods. For instance, points may be "splatted". These splats are represented as disks whose components (e.g. color) vary diametrically in normal (e.g. Gaussian) manner. Flat disks form a surface that is smoothed. In a variant, a triangulation may be performed on the points and the surface defined by a smoothed mesh based on the triangulation. The surface 11 may be computed by a graphic processor. It is used to determine visibility of points from a point of view. In the example of FIG. 1, for example, some points of the neck behind the chin, visible on the point cloud representation 10 are not visible on the surface representation 11 because the surface fills the space gap between points. With a surface representation, it is possible to determine whether a point of the point cloud is visible or not from a point of view.

FIG. 2 shows an image 20 representing a three-dimension scene comprising a surface representation of several objects captured as a point cloud. The image 20 is generated from a point of view different of the acquisition point of view. For example, the character at the right of the image 20 is not complete, points of his left arm and his back are not available (e.g. they have not been captured) to fulfill the surface representation. The scene represented on the image 20 may be split in two parts. A first part comprising objects that can be encoded in a 3 DoF video without degrading the viewing experience may be encoded in a "background" 3 DoF video stream. In FIG. 2, the background part comprises the floor and the walls of the scene. A foreground part comprises objects for which a 3 DoF+ viewing experience is wanted. In the example of FIG. 2, the foreground part corresponds to the characters and to the statues.

FIG. 3 illustrates an example of the encoding, transmission and decoding of a sequence of point clouds. A sequence of at least one point cloud 30 is encoded in a stream 32 by an encoder 31 according to the principles of the present encoding method. A decoder 33 obtains stream 32 from a source. For example, the source belongs to a set comprising:
- a local memory, e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 33 decodes a sequence of point clouds 34 from stream 32 according to the decoding method. According to the present principles, sequence of point clouds 34 is as similar to sequence of point clouds 30 as possible. Sequence of point clouds 34 may be obtained from a source by a rendered 35. Renderer 35 computes images to be displayed for a 3 DoF+ video viewing experience.

Figure 4:
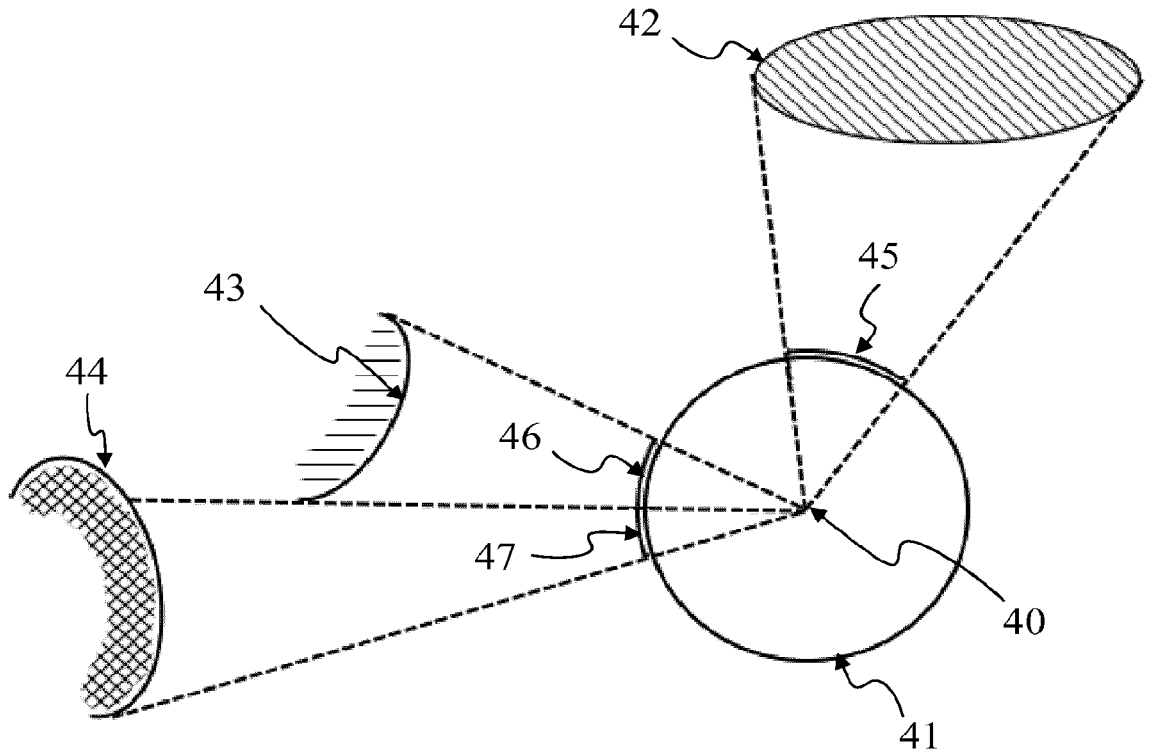
FIG. 4 illustrates a first iteration of the encoding method according to a center of projection, according to a non-restrictive embodiment of the present principles.

FIG. 4 illustrates a first iteration of the encoding method according to a center of projection 40. In example of FIG. 4, the point cloud comprises three objects 42, 43 and 44. Points of object 42 form a surface with a front side and a back side according to center of projection 40. Backside points of object 42 are not visible from center of projection 40. Points of objects 43 and 44 form surfaces with a front side only according to the center of projection 40. Points of object 43 are visible from center of projection 40 and only a part of the points of object 44 are visible from the center of projection because of the occultation by the surface of object 43. In example of FIG. 1, the first iteration is performed according to a unique center of projection. Iterations of the encoding method according to at least two centers of projection are described in relation to FIG. 16. In a first iteration of the encoding method and for a center of projection, points of the point cloud visible from the center of projection are projected on a projection map 41 according to a projection method. In the example of FIG. 4, the projection method is a spherical projection, for example a latitude/longitude projection or an equirectangular projection (aka. ERP), so the projection map is represented as a sphere on FIG. 4. In a variant, the projection method is a cubical projection method, a pyramid projection method or any projection method determined according to a center of projection. Points of the frontside of object 42 are projected in an area 45 of the projection map. Backside points of object 42 are not projected as they are not visible from center of projection 40. Every point of object 43 is visible from center of projection 40. They are projected according to the projection method on area 46 of projection map 41. Only a part of points of object 44 is visible from center of projection 40. Visible points of object 44 are projected on area 47 of projection map 41.

FIG. 5 shows a diagrammatical example of projection map 41 of FIG. 4. Pixels of area 45 store the depth information relative to visible points of visible points of object 42; pixels of area 46 store the depth information relative to visible points of visible points of object 43; and pixels of area 47 store the depth information relative to visible points of visible points of object 44. A pixel clustering operation is performed to cluster adjacent pixels of projection map 41 according to depth information. Pixels 45 constitute an adjacent cluster which may be delimited by a rectangle 55. Pixels 46 and 47 constitute an adjacent area of projection map 41. Pixels of area 46 and area 47 however differ on the depth value they store. Pixels 46 have a depth value notably smaller than the depth value of pixels 47. According to the present principles of the encoding method, clusters are determined according to their connection and their depth value. As there is a gap between the depth of pixels 46 and the depth of pixels 47, they are grouped in separate clusters. These two clusters may be represented as rectangles 56 and 57. High frequency area between the two areas may be absorbed by the clustering operation and rectangles 56 ad 57 may lightly overlap. Rectangle areas defined by the clustering operation are stored in memory as patch data items. For example, patch data for rectangle 57 comprise the angular range ($[\theta_{min}, \theta_{max}], [(\varphi_{min}, \varphi_{max}])$ of the visible points of object 44 according to center of projection 40; $\theta_{min}$ being the leftmost value of radial coordinates of points of the patch according to the center of projection, $\theta_{max}$ being the rightmost, $\varphi_{min}$ being the downmost and $\varphi_{max}$ being the upmost. The depth range $[\rho_{min}, \mu_{max}]$ of the pixel area is also registered in the patch data, where $\rho_{min}$ is the depth of the point which is the closest to the center of projection 40 and is the depth of the point which is the furthest from the center of projection 40. This component of patch data items is useful for encoding to increase dynamics of the byte range reserved for depth encoding. In a variant, clustering operation provide ellipsoid areas and patch data items comprise data representative of an ellipsoid area. Patch data items are added to a list of patch data items associated with the center of projection. At this step, points of the point cloud visible from the center of projection have been projected on the projection map and are removed from the point cloud, for not being projected in a further iteration of the encoding method.

FIG. 6 illustrates a second iteration of the encoding method according to the center of projection 40. At this step, already projected points have been removed from the point cloud. From points of the object, points 62 forming the back side of object 42 remain. Every point of object 43 have been remove from the point cloud as already projected and points 64 of object 44 remain to be projected. The projection of visible points as described in relation to FIG. 4 is iterated.

FIG. 7 diagrammatical shows the projection map resulting of the projection of the visible points of the remaining point cloud of FIG. 6. Rectangle 72 delimits a cluster corresponding to the projection of points 62. Rectangle 74 delimits a cluster corresponding to the projection of the visible points of the set of points 64. New patch data items are determined, two in the example of FIG. 7, each patch data item comprising the identification of the center of projection (center 40 in the example of FIGS. 4 to 7), a description of the region of the space occupied by the points projected in the cluster of the patch data item, this region being determined according to the center of projection, an angular range ($[\theta_{min}, \theta_{max}], [\varphi_{min}, \varphi_{max}]$) and a depth range $[\rho_{min}, \rho_{max}]$. Projected points are removed from the point cloud. After this iteration, the point cloud comprises only a part of points 64. A third iteration of the peeling operation is performed as described in reference to FIGS. 4 to 7.

The peeling operation aims at determining the list of patch data items for a point cloud according to one center of projection. This operation may be split into three steps. At each iteration, for a center of projection:

i. The part of the point cloud not already processed called "active set" is projected on a low-resolution projection map which origin is set at the center of projection. In the example of FIGS. 4 to 7, the chosen projection method is an equirectangular projection. In variants, the projection method maybe another spherical projection method as a latitude/longitude projection or a cubical projection or a pyramid projection or any projection method determined according to a center of projection. The resolution of the projection map is low (e.g. 1 pixel per degree or 2 pixels per degree) in order to prevent the clustering operation from generating too little clusters and thus produce an excessive number of patch data items.

ii. Then a clustering operation is performed in the projection map to identify homogeneous areas. In the examples of FIGS. 4 to 9, identified areas are rectangular. In variants, identified areas may have an ellipsoid shape. An area P covers a set of adjacent pixels of the projection map where a projection occurred and which is depth-consistent. The depth consistency check comes down to considering the distance Z between the center of projection and each projected point covered by P, and ensuring that the distance range of these pixels is not deeper than a threshold T. This threshold may depend on $Z_{max}$ (the maximum distance between the viewing point and the projected pixels covered by P), on the dynamic D of the depth stored in the generated picture by the further generating operation, and on perceptual properties. For example, the typical human visual acuity is about three minutes of arc. Determining the threshold T according to these criteria have several advantages. At one hand, an image patch in the picture generated in the further generating operation will cover a depth range consistent with the depth resolution of pixels of the generated picture (e.g. 10 bits or 12 bits) and, so, be robust to compression artifacts. On the other hand, the depth range is perceptually-driven by the 3 DoF+ context. Indeed, human vision does not equally perceive distance for close or far points. As an example, the threshold may be defined according to equation [eq. 1].

$$T(Z_{max}, D, VA) = Z_{max} \frac{2^D \tan\left(\frac{VA}{2}\right)}{1 + 2^D \tan\left(\frac{VA}{2}\right)} \quad [\text{eq. 1}]$$

Where VA is a value for visual acuity.

iii. The region of space comprising the points of the active set of points is stored in the newly created patch data item; This region is determined according to the center of projection, the angular range and depth range of the projected point covered by area P. These points discarded from the set of active points. If the set of active points is empty, the peeling process is completed.

Once the list of patch data items has been determined, each point of the point cloud is paired with one patch data item as belonging to the region associated with the patch data item.

FIG. 14 shows a region of the space as described in a patch data item according to a spherical projection on the left and according to a cubical projection on the right. On the left of FIG. 14, according to a spherical projection method, each patch data item comprises data corresponding to a region of the space 140 delimited by two portions of concentric spheres centered on the center of projection 141. The region is characterized by: first, an angular range 142, defined by $[\theta_{min}, \theta_{max}]$ belonging to $[-\pi; \pi]$ radians and $[\varphi_{min}, \varphi_{max}]$ belonging to $[-\pi/2; \pi/2]$ radians and, second, a depth range 143 $[\rho_{min}, \rho_{max}]$. Same description is used for a cubical projection method on the right of FIG. 14. The region of the space 140 delimited by a truncated four-sided pyramid pointing to the center of projection 141 and characterized by angular range 142 and depth range 143. Such projection methods (e.g. an equirectangular projection) are only angle-dependent. A big object far from the center of projection may take the same area in the projection map than a small close object. According to the present principles, it is so possible to adapt the patch size according to the importance of the object from the center of projection and not according to the intrinsic size of projected object. Such a property is in line with a 3 DoF+ context.

FIG. 15 illustrates a point cloud to encode located on a line (or a plane) passing through the center of projection. FIG. 15 illustrates a configuration in which the iterative peeling process, described in relation to FIGS. 4 to 7, may be very long. In a first iteration, only point 151 is visible from the center of projection 150. A patch data item is determined for this only point 151. Point 151 is removed from the point cloud and point 152 is now the only point of the point cloud visible from the center of projection. Again, a patch data item is determined for a very small set of points (a unique point in the example of FIG. 15). The issue is repeated for points 153, 154 and 155, generating a lot of patch data item and a lot of image patch in the picture to encode. Such configurations of points of the point cloud relatively to a center of projection are not rare.

FIG. 16 illustrates the point cloud of FIG. 15 processed according to another center of projection. From center of projection 160, every point of the point cloud is visible. They are projected on an area 161 of the projection map and only one patch data item is determined for the five points of the point cloud.

According to the present principles, a group of centers of projection comprising at least two centers of projection is determined. Coordinates of centers of projection of the group are, for example, set around the viewing point from which the volumetric scene is encoded. At each iteration of the peeling operation, for each center of projection of the group, points of the point cloud visible from the center of projection are projected on a projection map associated with the center of projection. The clustering operation is performed and one of the centers of projection is selected. Selection of one center of projection among centers of projection of the group may be performed according to the number and/or the size of patches described by patch data items. For example, selecting the center of projection with the bigger regions of the space and the smallest number of patch data items may be considered. For example, the center of projection with the highest average volume of the regions of the space described in the patch data items of the list is selected. In a variant, the selected center of projection is the one for which the area covered by clusters over the projection map is the highest. Criteria for the selection of a center of projection among the group are defined in order to optimize the encoding process by accelerating the peeling procedure, and to reduce the overall bitrate by minimizing high-frequencies due to the image patch borders in the picture to encode.

In an embodiment, the group of centers of projection comprises four not coplanar centers of projection. The determination of four not coplanar centers of projection allows to prevent any effect of low-convergence of the peeling operation as no three-dimension configuration of the point cloud may be aligned with four not coplanar points. For example, coordinates of the four centers of projection of the group may be determined to form a tetrahedron around the viewing point from which the volumetric scene is encoded. The tetrahedron may be included in the viewing space (i.e. the volume around the viewing point in which the user may move his head in 3 DoF+ viewing conditions).

The patch data items determined at the current iteration for the selected center of projection are added to the list of patch data items for the point cloud and points visible from the selected center of projection are removed from the point cloud in preparation to the next iteration of the peeling operation. Each patch data item stores an identification of the center of projection according to which it has been determined, because, corresponding image patches will be packed in the picture without consideration of the center of projection.

FIG. 8 shows a picture comprising image patches encoding depth information of the point cloud of the scene of FIG. 2. In this example, the peeling operation has been performed on the point cloud of the scene of FIG. 2. A list of patch data items has been determined according to a group of four not coplanar centers of projection. Image patches have a resolution called "Atlas Resolution" which defines the quality of the point cloud encoding. For example, an atlas resolution from 18 to 25 pixels per degree allows the encoding of complex scene like the scene of FIG. 2 in a 2048×2048 pixels picture containing a large number of image patches (e.g. 500 or 600 patches). The lower this resolution is, the worse the final quality. To ensure a good alignment of the image patches on the grid of the picture, the projection maps resolution may be chosen as an integral divider of the atlas resolution. A packing operation of image patches is performed. Numerous heuristic algorithms exist to solve the NP-complete problem of packing rectangular cells into a rectangular bin (i.e. the picture to be generated), as the algorithm described in "A Thousand Ways to Pack the Bin" by Jukka Jylanki for instance or the "MaxRects" algorithm (i.e. Single Bin—Best Short Side First configuration) which provides good filling ratio at quite low computational costs. At the end of the packing operation, a location (x, y) of the image patch in the picture (e.g. lower left corner position), and, according to the packing algorithm, a boolean value indicating whether the image patch has been rotated are assigned to each patch of the patch data item list. The packing may be optimized by aligning the patches on Coding Units of the video encoder in order to improve the decoding stage. FIG. 8 shows a picture in which are packed image patches of the list of patch data items determined for the point cloud of the scene illustrated on FIG. 2. Pixels of the picture of FIG. 8 comprise depth information (i.e. the distance between points of the point cloud and the center of projection).

FIG. 9 shows a picture comprising color image patches of the list of patch data items determined for the point cloud of the scene illustrated on FIG. 2 according to a non-restrictive embodiment of the present principles. In an embodiment, depth and color information are encoded in pixels of a unique picture. In another embodiment, depth and color information are encoded in two pictures.

According to the present principles, a point cloud of the sequence of point clouds is encoded as a picture comprising packed image patches associated with data representative of a list of patch data items. The encoding of a point cloud as a picture associated with data has the advantage to be in line with standard compression and transport video pipelines. It is usual, for compression reasons, to gather series of pictures in Group of Pictures (GoP). According to an embodiment of the present encoding method, successive point clouds of the sequence of point clouds to encode are gathered together as a unique point cloud. This grouped point cloud goes through the peeling operation and the packing operation. A unique list of patch data items is determined for every point cloud of the group. The packing structure of the picture is computed for the whole GoP. This structure is preserved during one group of pictures as it notably reduces the video encoding bitrate, especially when the encoder is setup to disable open-gop optimization. Color and depth pictures comprise the results of the splatted projection of each point on image patches. Pictures of the group of pictures and data representative of the list of patch data items are encoded in the stream.

FIG. 10 shows an example architecture of a device 10 which may be configured to implement a method described in relation with FIGS. 12 and/or 13. The device 10 may be configured to be an encoder 31, a decoder 33 and/or a renderer 35 of FIG. 3.

The device 10 comprises following elements that are linked together by a data and address bus 101:
- a microprocessor 102 (or CPU), which is, for example, a DSP (or Digital Signal Processor);
- a ROM (or Read Only Memory) 103;
- a RAM (or Random Access Memory) 104;
- a storage interface 105;
- an I/O interface 106 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data).

The ROM 103 comprises at least a program and parameters. The ROM 103 may store algorithms and instructions to perform techniques in accordance with present principles. When switched on, the CPU 102 uploads the program in the RAM and executes the corresponding instructions.

The RAM 104 comprises, in a register, the program executed by the CPU 102 and uploaded after switch-on of the device 10, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 31 of FIG. 3, the sequence of at least one point of cloud 30 is obtained from a source. For example, the source belongs to a set comprising:

- a local memory (103 or 104), e.g. a video memory or a RAM (or Random Access Memory), a flash memory, a ROM (or Read Only Memory), a hard disk
- a storage interface (105), e.g. an interface with a mass storage, a RAM, a flash memory, a ROM, an optical disc or a magnetic support;
- a communication interface (106), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 33 of FIG. 3, the stream is sent to a destination; specifically, the destination belongs to a set comprising:

- a local memory (103 or 104), e.g. a video memory or a RAM, a flash memory, a hard disk
- a storage interface (105), e.g. an interface with a mass storage, a RAM, a flash memory, a ROM, an optical disc or a magnetic support; and
- a communication interface (106), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi or a Bluetooth interface).

In accordance with examples of encoding or encoder, a bitstream comprising data representative of the volumetric scene is sent to a destination. As an example, the bitstream is stored in a local or remote memory, e.g. a video memory (104) or a RAM (104), a hard disk (103). In a variant, the bitstream is sent to a storage interface (105), e.g. an interface with a mass storage, a flash memory, ROM, an optical disc or a magnetic support and/or transmitted over a communication interface (106), e.g. an interface to a point to point link, a communication bus, a point to multipoint link or a broadcast network.

In accordance with examples of decoding or decoder or renderer 35 of FIG. 3, the bitstream is obtained from a source. Exemplarily, the bitstream is read from a local memory, e.g. a video memory (104), a RAM (104), a ROM (103), a flash memory (103) or a hard disk (103). In a variant, the bitstream is received from a storage interface (105), e.g. an interface with a mass storage, a RAM, a ROM, a flash memory, an optical disc or a magnetic support and/or received from a communication interface (105), e.g. an interface to a point to point link, a bus, a point to multipoint link or a broadcast network.

In accordance with examples, the device 10 is configured to implement a method described in relation with FIG. 12, and belongs to a set comprising:

- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

In accordance with examples, the device 10 is configured to implement a rendering method described in relation with FIG. 13, and belongs to a set comprising:

- a mobile device;
- a communication device;
- a game device;
- a set top box;
- a TV set;
- a tablet (or tablet computer);
- a laptop; and
- a display (such as a HMD for example).

FIG. 11 shows an example of an embodiment of the syntax of a stream when the data are transmitted over a packet-based transmission protocol. FIG. 11 shows an example structure 1100 of a volumetric video stream. The structure consists in a container which organizes the stream in independent syntax elements. The structure may comprise a header part 1101 which is a set of data common to every syntax elements of the stream. For example, the header part comprises metadata about syntax elements, describing the nature and the role of each of them. The header part may also comprise the coordinates of the centers of projection used for the encoding and information about the size and the resolution of pictures. The structure comprises a payload comprising syntax elements 1102 and 1103. The first syntax element 1102 comprises data representative of pictures comprising image patches. Pictures may have been compressed according to a video compression method. A picture is associated with a list of patch data items of the second syntax element 1103. In an embodiment, the first syntax element comprises a sequence of pairs of pictures, one picture encoding depth information, the paired picture encoding color information. The second syntax element comprises data representative of the list of patch data items associated with pictures of the first syntax element 1102. A list of patch data items may be associated with a group of pictures. A patch data item comprises an identification of a center of projection, a description of a region of the space determined according to the center of projection, an angular range and a depth range and a description of the shape and location of the corresponding image patch in at least one picture.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

FIG. 12 illustrates a method for encoding a point cloud in a stream, in a device 10 (described with regard to FIG. 10) configured to be a device 31 of FIG. 3, according to a non-restrictive embodiment of the present principles.

In a step 1200, the different parameters of the device 10 are updated. In particular, the point cloud is obtained from a source, a group of centers of projection is determined in the space of the point cloud, a projection method is initialized for each center of projection of the group, sizes and resolutions of projection maps and pictures are determined and an empty list of patch data items is created.

A list of patch data items determining operation 1201 is performed. This operation is an iterative process comprising steps 1202, 1203 and 1204. In step 1202, for each center of projection of the group of centers of projection, points of the point cloud which are visible from the center of projection are projected according to the projection method on a corresponding projection map. The resolution of the projection map is low (e.g. 1 pixel per degree or 2 pixels per degree) in order to prevent the clustering step 1203 from generating too little clusters and thus produce an excessive number of patch data items. In step 1203, adjacent pixels of the projection map are clustered according depth information. One of the centers of projection is selected according to the list of patch data items determined by the clustering. Criteria for selecting a center of projection among the others of the group are defined in order to optimize the encoding process by accelerating the peeling procedure, and to reduce the overall bitrate by minimizing high-frequencies due to the image patch borders in the picture to encode. Patch data items associated with the selected center of projection are added to the list of patch data items under construction. Iterations are performed until the point cloud is empty. In a variant, the operation 1201 is iterated until the list of patch data items is full. The list of patch data items is considered as full when the area needed for encoding image patches of the patch data items of the list is bigger than the area of the bin (i.e. the picture in which image patches will be arranged in operation 1205).

Once the list of patch data items is determined, a packing operation 1205 is performed resulting in the generation of the picture. Points of the point cloud are projected in image patches, image patches having the same resolution than the picture. Image patches are arranged in an optimized manner in the picture.

In a step 1206, the picture and associated list of patch data items are encoded in the stream according to the syntax described in relation to FIG. 11. The encoding method may be repeated for other point clouds of a sequence of point clouds. In an embodiment of the present principles, a group of point clouds of the sequence, gathered as a unique point cloud, is used as the entry point cloud of the encoding method. A list of patch data items common to pictures of the generated group of pictures is determined and encoded once in the stream in association with the whole group of pictures.

FIG. 13 illustrates a method for decoding a point cloud from a stream, in a device 10 (described with regard to FIG. 10) configured to be a device 33 of FIG. 3, according to a non-restrictive embodiment of the present principles.

In a step 1300, the different parameters of the device 10 are updated. In particular, the stream is obtained from a source, a group of centers of projection is determined in the space of the point cloud and an un-projection method is initialized. For example, coordinates of centers of projection of the group are obtained from a memory. In a variant, coordinates of the centers of projection of the group are decoded from the stream.

In a step 1301, a picture and a list of patch data items are decoded from the stream. A list of patch data items may be associated with a group of pictures. A patch data item comprises an identification of one of the center of projection of the group, a description of a region of the space defined by the center of projection, an angular range and a depth range and information identifying an area within associated pictures. A picture comprises a set of image patches packed in the pixel grid of the picture. In a step 1302, image patches are unpacked from the picture according to patch data items. The information identifying an area within the picture comprised in each patch data item describes the location and the shape of the image patch in the pixel grid of the picture. This information, the angular range of the patch data item and the picture resolution are used to unpack image patches. A patch data item also comprises a depth range that is used at step 1303. Each unpacked image patch is associated with the corresponding patch data item. In a step 1303, pixels of unpacked images are un-projected according to associated patch data item. The depth information stored in a pixel is decoded according to the depth range allowing an optimal use of the dynamic of the pixel, the depth being encoded for example on 10 bits or 12 bits. The location in space of the decoded point is then computed according to the coordinates of the pixel within the image patch, the coordinates of the identified center of projection, the angular range and the decoded depth. The direction of the point according to the center of projection is, for example, linearly interpolated according to the coordinates of the pixel within the frame of reference of the image patch and the angular range ($[\theta_{min}, \theta_{max}]$, $[\varphi_{min}, \varphi_{max}]$) comprised in the associated patch data item. The point is projected in the determined direction at a distance from the center of projection corresponding to the determined depth. If pixels of the picture store a color value or if a color value is stored in a picture paired with depth picture, this color value is assigned to the projected point.

Naturally, the present disclosure is not limited to the embodiments previously described.

In particular, the present disclosure is not limited to methods and devices for encoding/decoding a stream carrying data representative of a volumetric scene (i.e. a sequence of three-dimension point clouds) but also extends to methods of encoding/decoding a sequence of two-dimension point clouds and to any devices implementing these methods and notably any devices comprising at least one CPU and/or at least one GPU.

The present disclosure also relates to a method (and a device configured) for displaying images rendered from the data stream comprising the information representative of the volumetric scene and to a method (and a device configured) for rendering and displaying the object with a flat video.

The present disclosure also relates to a method (and a device configured) for transmitting and/or receiving the stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining a group of centers of projection;
determining, for a point cloud, a list of patch data items by projecting on a projection map, points of the point cloud visible from one center of projection of the group of centers of projection and clustering adjacent pixels as image patches, a patch data item being associated with an image patch and comprising:
information identifying the one center of projection; and
parameters indicative of an extent of a rectangle bounding the image patch;
generating the picture comprising a set of image patches; and
encoding, in the stream, the picture and the list of patch data items.

2. The method of claim 1, wherein determining the list of data items comprises:
a. for a first and a different second center of projection among the group of centers of projection:
determining a first list of patch data items by projecting on a first projection map, points of the point cloud visible from the first center of projection and by clustering adjacent pixels of the first projection map according to depth information;
determining a second list of patch data items by projecting on a second projection map, points of the point cloud visible from the second center of projection and by clustering adjacent pixels of the second projection map according to depth information;
b. selecting one of the first and second list of patch data items and adding the selected list of patch data items to the list of patch data items; and
c. removing the points of the point cloud visible from the center of projection of the selected list; and
d. iterating a, b and c until the point cloud is empty or the patch data item list is full.

3. The method of claim 2, wherein the point cloud comprises points of a group of point clouds of a sequence of point clouds, a list of patch data items being determined for a group of pictures, each picture of the group of pictures being generated for a point cloud of the group of point clouds, and the encoding comprising encoding, in the stream, the group of pictures and the list of patch data items.

4. The method of claim 2, wherein a pixel of an image patch comprises a depth value, the depth value being determined according to depth range of the patch data item associated with the image patch.

5. The method of claim 4, wherein a pixel of the image patches further comprises a color value.

6. The method of claim 5, wherein depth values are stored by pixels of a first picture and color values are stored by pixels of a second picture, first and second pictures being paired and encoded into the stream.

7. A device, comprising:
a memory associated with at least one processor configured to:
obtain a group of centers of projection determined according to a viewing point;
determine, for a point cloud, a list of patch data items by projecting on a projection map, points of the point cloud visible from one center of projection of the group of centers of projection and clustering adjacent pixels as image patches, a patch data item being associated with an image patch and comprising:
information identifying the one center of projection; and parameters indicative of an extent of a rectangle bounding the image patch;

generate the picture comprising a set of image patches; and encode, in the stream, the picture and the list of patch data items.

8. The device of claim 7, wherein the at least one processor is configured to determine, for the point cloud, a list of data items by:

a. for a first and a different second center of projection among the group of centers of projection:

determining a first list of patch data items by projecting on a first projection map, points of the point cloud visible from the first center of projection and by clustering adjacent pixels of the first projection map according to depth information;

determining a second list of patch data items by projecting on a second projection map, points of the point cloud visible from the second center of projection and by clustering adjacent pixels of the second projection map according to depth information;

b. selecting one of the first and second list of patch data items and adding the selected list of patch data items to the list of patch data items; and c. removing the points of the point cloud visible from the center of projection of the selected list; and d. iterating a, b and c until the point cloud is empty or the patch data item list is full.

9. The device of claim 8, wherein the point cloud comprises points of a group of point clouds of a sequence of point clouds, a list of patch data item list being determined for a group of pictures, each picture of the group of pictures being generated for a point cloud of the group of point clouds, the at least one processor being configured to encode, in the stream, the group of pictures and the list of patch data items.

10. The device of claim 8, wherein a pixel of an image patch comprises a depth value, the depth value being determined according to depth range of the patch data item associated with the image patch.

11. A method of decoding a point cloud from a stream, the method comprising:

obtaining a group of centers of projection;

decoding a picture packing image patches and a list of patch data items from the stream, a patch data item being associated with an image patch and comprising:

information identifying one center of projection within the group of centers of projection; and parameters indicative of an extent of a rectangle bounding the image patch on a projection map responsive to the one center of projection; and decoding points of the point cloud by inverse projecting pixels of each image patch according to the associated patch data item.

12. The method of claim 11, wherein coordinates of the centers of projection of the group are obtained from a memory.

13. A device for decoding a point cloud from a stream, the device comprising:

a memory associated with at least a processor configured to:

obtain a group of centers of projection;

decode a picture packing image patches and a patch data item from the stream, a patch data item being associated with an image patch and comprising:

information identifying one center of projection within the group of centers of projection; and parameters indicative of an extent of a rectangle bounding the image patch on a projection map responsive to the one center of projection; and decode points of the point cloud by inverse projecting pixels of each image patch according to the associated patch data item.

14. The device of claim 13, wherein coordinates of the centers of projection of the group are obtained from the stream.

15. A computer readable recording medium having recorded thereon a computer program comprising software code instructions for performing the method according to claim 1, when the computer program is executed by a processor.

16. A non-transitory computer readable medium having stored thereon encoded data content generated by the device of claim 7.

17. A computer readable recording medium having recorded thereon a computer program comprising software code instructions for performing the method according to claim 11, when the computer program is executed by a processor.

18. A non-transitory computer readable medium having stored thereon decoded data content generated by the device of claim 13.

* * * * *